United States Patent
Kashiwagi et al.

(10) Patent No.: US 11,392,650 B2
(45) Date of Patent: Jul. 19, 2022

(54) DATA ACCUMULATION APPARATUS, DATA ACCUMULATION METHOD, AND PROGRAM

(71) Applicant: NIPPON TELEGRAPH AND TELEPHONE CORPORATION, Tokyo (JP)

(72) Inventors: Keiichiro Kashiwagi, Musashino (JP); Makoto Takizawa, Yokosuka (JP); Hiroyuki Tanaka, Musashino (JP); Takayuki Nakamura, Musashino (JP); Yui Yoshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 224 days.

(21) Appl. No.: 16/342,150

(22) PCT Filed: Nov. 9, 2017

(86) PCT No.: PCT/JP2017/040467
§ 371 (c)(1),
(2) Date: Apr. 15, 2019

(87) PCT Pub. No.: WO2018/088490
PCT Pub. Date: May 17, 2018

(65) Prior Publication Data
US 2019/0258679 A1    Aug. 22, 2019

(30) Foreign Application Priority Data

Nov. 10, 2016  (JP) .............................. JP2016-219472

(51) Int. Cl.
*H04L 67/02* (2022.01)
*H04L 67/10* (2022.01)
(Continued)

(52) U.S. Cl.
CPC ........ *G06F 16/90335* (2019.01); *G06F 13/00* (2013.01); *G06F 16/00* (2019.01);
(Continued)

(58) Field of Classification Search
CPC ...... G06F 13/00; G06F 16/00; G06F 16/2458; G06F 16/25; G06F 16/90335;
(Continued)

(56) References Cited

U.S. PATENT DOCUMENTS

2005/0015571 A1* 1/2005 Kaufman ................ G06F 30/23
712/10
2011/0289133 A1* 11/2011 Shikano .................. H04L 67/12
709/202
(Continued)

FOREIGN PATENT DOCUMENTS

JP    H09-245053 A    9/1997
JP    2006-92028 A    4/2006
(Continued)

OTHER PUBLICATIONS

CA Extended European Search Report from counterpart EP17869456.8, dated Mar. 18, 2020.
(Continued)

*Primary Examiner* — Irete F Ehichioya
*Assistant Examiner* — Xiaoqin Hu
(74) *Attorney, Agent, or Firm* — Harness, Dickey & Pierce, P.L.C.

(57) ABSTRACT

In one aspect, a data accumulation apparatus includes a script execution environment, an accumulation and retrieval unit accumulating data and performing retrieval on the accumulated data, a notification unit outputting notification in response to that data newly accumulated in the accumulation and retrieval unit matches one of conditions registered in advance, and a storage unit storing scripts and action
(Continued)

correspondence information. The script execution environment has property of being capable of describing an instruction to perform data retrieval and an instruction to perform communication through the network, according to a script being executed. The data accumulation apparatus further includes a collection unit collecting data through the network and registering the data in the accumulation and retrieval unit, and a script execution unit executing, on receipt of the notification, a script associated with the matched condition according to the action correspondence information using the script execution environment.

15 Claims, 5 Drawing Sheets

(51) Int. Cl.
*H04L 67/12* (2022.01)
*G06F 16/00* (2019.01)
*G06F 13/00* (2006.01)
*G06F 16/903* (2019.01)
*G06F 16/93* (2019.01)
*G06F 16/953* (2019.01)
*G06F 16/951* (2019.01)

(52) U.S. Cl.
CPC ............ *G06F 16/93* (2019.01); *G06F 16/951* (2019.01); *G06F 16/953* (2019.01); *H04L 67/02* (2013.01); *H04L 67/10* (2013.01); *H04L 67/12* (2013.01)

(58) Field of Classification Search
CPC ...... G06F 16/93; G06F 16/951; G06F 16/953; H04L 67/02; H04L 67/10; H04L 67/12
See application file for complete search history.

(56) References Cited

U.S. PATENT DOCUMENTS

2013/0054721 A1* 2/2013 Caden ................... H04L 12/00
709/206
2014/0351311 A1 11/2014 Nakatsugawa et al.

FOREIGN PATENT DOCUMENTS

| JP | 2010-20518 A | 1/2010 |
|---|---|---|
| JP | 5948399 B2 | 7/2016 |

OTHER PUBLICATIONS

International Search Report (in English and Japanese) and Written Opinion (Japanese) of the International Searching Authority issued in PCT/JP2017/040467, dated Feb. 13, 2018; ISA/JP.
Japanese Office Action from counterpart application JP2018/550264, including English translation, dated Dec. 24, 2019.
International Preliminary Report on Patentability, including the English translation of the Written Opinion, regarding PCT/JP2017/040467, dated May 23, 2019.

* cited by examiner

SCRIPT 300

```
var to = new Date().getTime();          ⎫
var from = to - 60*1000;                ⎬── ROW GROUP 301
                                        ⎭ var thermometer = ajax.collect({"subject":"sensor", "type":"thermometer",  ⎫── ROW 302
    "date":[from/1000,to/1000]});                                          ⎭
var t_len = Object.keys(thermometer).length;
if (t_len > 0) {
    ajax.request({                                         ⎫
        "type":"POST",                                     ⎪
        "url":"http://192.168.0.3:8080/",                  ⎬── ROW 303
        "headers": {"Content-Type": "application/x-www-form-urlencoded"},  ⎪
        "data": thermometer});                             ⎭
}
```

MESSAGE 400

```
[
{"date":1473240068,"subject":"sensor","temperature":27.53125,"type":"thermo meter"},
{"date":1473240069,"subject":"sensor","temperature":27.53125,"type":"thermo meter"},
{"date":1473240070,"subject":"sensor","temperature":27.53125,"type":"thermo meter"},
{"date":1473240071,"subject":"sensor","temperature":27.53125,"type":"thermo meter"},
{"date":1473240072,"subject":"sensor","temperature":27.53125,"type":"thermo meter"}
]
```

— ROW 401 (first entry)

F I G. 4

SCRIPT 500

```
var to = new Date().getTime();
var from = to - 60*1000;

ajax.request({
  "type":"POST",
  "url": "http://192.168.0.5:4035/gotapi/notification/notify",
  "headers": {"Content-Type": "application/x-www-form-urlencoded"},
  "data":
    "serviceId=Host.e87e3213b730843a437ff6c676899df0.localhost.deviceconn
ect.org&type=3&body=%E9%9A%9C%E5%AE%B3%E7%A2%BA%E8%AA%8D
&tag=http%3A%2F%2F192.168.0.3%3A8000%2Fwotengine%2Fope%2F%3Fop
e%3D0%26from%3D"+from+"%26to%3D"+to+"%26info1%3Dhttp%3A%2F%2F
192.168.0.3%3A8000%2Fpublic%2Fmaps%2F%26info2%3Dhttp%3A%2F%2F1
92.168.0.3%3A8000%2Fpublic%2Frobotarm4%
2F%26info3%3Dhttp%3A%2F%2F192.168.0.3%3A8000%2Fpublic%2Fe
q%2F"});
```

— ROW GROUP 501 (first two lines)
— ROW 502 (ajax.request block)

F I G. 5

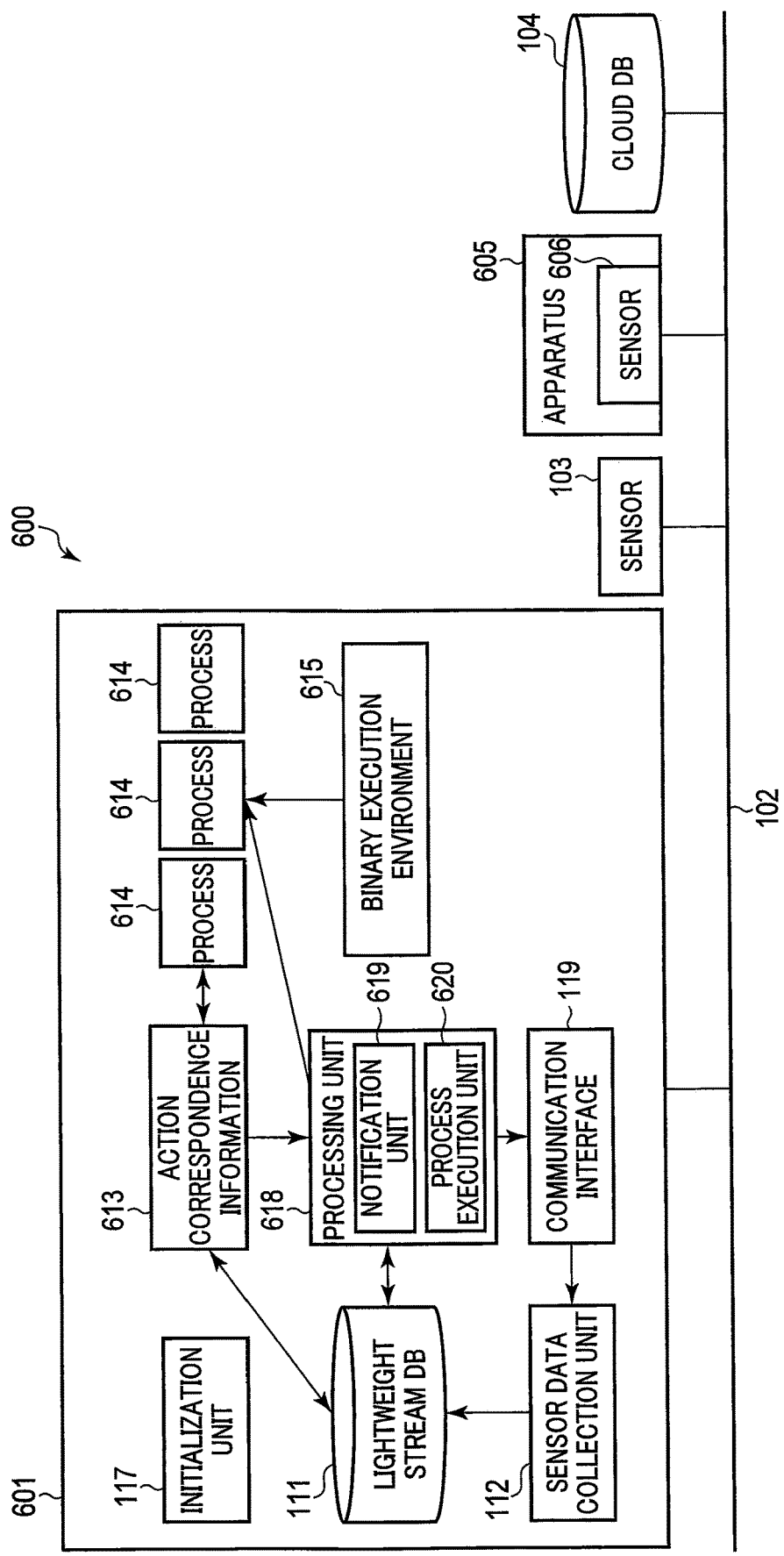
F I G. 6

DATA ACCUMULATION APPARATUS, DATA ACCUMULATION METHOD, AND PROGRAM

CROSS-REFERENCE TO RELATED APPLICATIONS

This application is a 371 of U.S. National State of International Application No. PCT/JP2017/040467, filed on Nov. 9, 2017, which claims priority to Japanese Application No. 2016-219472, filed on Nov. 10, 2016. The entire disclosures of the above applications are incorporated herein by reference.

FIELD

The present invention relates to a data accumulation apparatus, a data accumulation method, and a program accumulating data such as sensor data.

BACKGROUND

In a field called sensor network or IoT (Internet of Things), there are many examples of constructing a system in which sensors are connected to a network, pieces of data acquired by the sensors are aggregated and accumulated in a cloud. However, when the system is designed such that respective sensors are connected to the Internet to directly transmit data to the cloud, the system has problems in respect of security, the processing capacity of the sensors, and/or the communication load.

For this reason, in many cases, the system adopts a structure in which an apparatus aggregating pieces of data is provided between the sensor and the cloud. With the three-stage structure formed of the sensors, the data aggregation apparatus, and the cloud, it is possible to leave securement of security in the Internet communication to the data aggregation apparatus. In addition, because the sensors may communicate with only the data aggregation apparatus, the sensors can be achieved with simple computers, and the problem of the processing capacity is solved.

In addition, by adding a function of temporarily accumulating data to the data aggregation apparatus, the data aggregation apparatus is enabled to also operate as a buffer temporarily aggregating pieces of data. For example, when the data aggregation apparatus accumulates 60 pieces of data from a temperature sensor, which outputs one piece of data per minute, and transmits the pieces of data for 1 hour together to the cloud, the number of times of communications is reduced, and the problem of the communication load is also solved.

In addition, in prior art, known techniques include a database (DB) technique for a sensor network called uTSLite (Light uTupleSpace) (see Japanese Patent No. 5948399). uTSLite not only has a function of accumulating data and retrieving later, like ordinary relational databases (RDB), but also has a function of registering a condition in advance, automatically determining whether data matches the condition when the data is accumulated later, and notifying the application that the data matches the condition when the data matches the condition. Using such functions reduces the labor to develop an application to set conditional expressions in advance for various abnormal events and perform notification when an abnormal event occurs.

The existing apparatuses performing data aggregation and accumulation as described above have a problem of scarce multiplicity of use and difficulty in development, as detailed hereinafter. For example, some matters are different between individual application examples of sensor networks. The matters include, for example, which sensors are to be connected, for how many number of times pieces of data are to be aggregated and sent, and to which service on the cloud data is to be sent. For this reason, there is the problem that the apparatuses cannot be constructed as uniform general-purpose apparatuses but have to be developed individually for the respective application examples.

In particular, this problem causes a marked problem in an application example in which data is specially sent when a specific notable event occurs in the case where pieces of data are aggregated. For example, in the example described above, when an emergency event seemed to be a fire is sensed with the temperature sensor, it is required to send alert signal urgently without waiting for sending performed once per hour. However, because it is entirely different between application examples which sensor is to be connected, and which urgent signal is to be sent according to which condition determination, such processing is not achieved by simply data definition, such as "aggregation of pieces of data for N number of times" and "aggregation of pieces of data for N seconds". This reason requires individual development, and causes difficulty in development.

In addition, even when uTSLite is used, the problem described above still exists. Because uTSLite is a software library, uTSLite alone cannot solve the problem described above with respect to the point that application software using uTSLite have to be newly developed.

SUMMARY

The present invention has been made in consideration of the circumstances described above. An object of the present invention is to provide a data accumulation apparatus, a data accumulation method, and a program capable of flexibly defining how pieces of data are aggregated and sent by what condition determination in an apparatus performing aggregation and accumulation of data, such as sensor data.

In a first aspect of the present invention, a data accumulation apparatus accumulating data received through a network includes a script execution environment, an accumulation and retrieval unit accumulating data and performing retrieval on the accumulated data, a notification unit outputting notification in response to that data newly accumulated in the accumulation and retrieval unit matches one of conditions registered in advance, and a storage unit storing scripts and action correspondence information indicating correspondence between the conditions registered in advance and the scripts, the script execution environment has property of being capable of describing an instruction to perform data retrieval and an instruction to perform communication through the network, according to a script being executed, and the data accumulation apparatus further includes a collection unit collecting data through the network and registering the data in the accumulation and retrieval unit, and a script execution unit executing, on receipt of the notification, a script associated with the matched condition according to the action correspondence information using the script execution environment.

In a second aspect, the scripts include an acquisition unit acquiring data from the accumulation and retrieval unit in accordance with the instruction to perform data retrieval, and a sending unit sending the data acquired by the acquisition unit to the network in accordance with the instruction to perform communication through the network.

In a third aspect, each of the conditions registered in advance is a condition matching only part of data in a set of all the data registered by the collection unit, the data acquired by the acquisition unit is one or more pieces of data, and the one or more pieces of data is sent in a state of being stored in a data structure of one of an array, a list, a structure, and a nest structure, or sent after identifiers are provided to the one or more pieces of data, when the one or more pieces of data is sent in accordance with the instruction to perform communication through the network.

In a fourth aspect, the script execution environment includes a class library, the class library includes a class to perform data retrieval and a class to perform communication through the network, and the property is achieved by calling the class library with the script being executed.

In a fifth aspect, the instruction to perform communication through the network uses a HTTP or HTTPS protocol as a transport protocol, and uses a JSON or XML data format as a data exchange code.

In a sixth aspect, the script execution unit sends an accumulation instruction to a document-oriented database in accordance with the instruction to perform communication through the network, the document-oriented database accumulating a document described in the JSON or XML data format.

In a seventh aspect, the script execution unit sends a notification signal to notify an information processing apparatus connected to the network of occurrence of an event, in accordance with the instruction to perform communication through the network.

In an eighth aspect, the script execution unit sends a notification signal to notify an information processing apparatus connected to the network of occurrence of an event, in accordance with the instruction to perform communication through the network, and the notification signal includes identification information to distinguish a data set formed of the one or more pieces of data from another data set.

In a ninth aspect, both the accumulation and retrieval unit and the notification unit are achieved using uTSLite.

In a tenth aspect, a data accumulation apparatus accumulating data received through a network includes a binary execution environment, an accumulation and retrieval unit accumulating data and performing retrieving on the accumulated data, a first notification unit outputting first notification in response to that data newly accumulated in the accumulation and retrieval unit matches one of conditions registered in advance, and a storage unit storing action correspondence information indicating correspondence between the conditions registered in advance and processes operating on the binary execution environment, the binary execution environment has property of being capable of describing an instruction to perform data retrieval and an instruction to perform communication through the network, according to the process being executed, and the data accumulation apparatus further includes a collection unit collecting data through the network and registering the data in the accumulation and retrieval unit, and a second notification unit outputting, on receipt of the first notification, second notification to a process associated with the matched condition according to the action correspondence information.

In an eleventh aspect, the processes include an acquisition unit acquires data from the accumulation and retrieval unit, in accordance with the instruction to perform data retrieval, and a sending unit sending the data acquired by the acquisition unit to the network, in accordance with the instruction to perform communication through the network.

In a twelfth aspect, each of the conditions registered in advance is a condition matching only part of data in a set of all the data registered by the collection unit, the data acquired by the acquisition unit is one or more pieces of data, and the one or more pieces of data is sent in a state of being stored in a data structure of one of an array, a list, a structure, and a nest structure, or sent after any identifiers are provided to the one or more pieces of data, when the data is sent in accordance with the instruction to perform communication through the network.

In a thirteenth aspect, the binary execution environment includes a class library, the class library includes a class to perform data retrieval and a class to perform communication through the network, and the property is achieved by calling the class library with the process being executed.

In a fourteenth aspect, the instruction to perform communication through the network uses a HTTP or HTTPS protocol or a MQTT protocol as a transport protocol, and uses a JSON or XML data format as a data exchange code.

In a fifteenth aspect, the data accumulation apparatus further includes a process execution unit executing the processes using the binary execution environment, and the process execution unit sends an accumulation instruction to a database in accordance with the instruction to perform communication through the network, the database accumulating data or a file described in the JSON or XML data format.

In a sixteenth aspect, the data accumulation apparatus further includes a process execution unit executing the processes using the binary execution environment, the process execution unit sends a notification signal to notify an information processing apparatus connected to the network of occurrence of an event, in accordance with the instruction to perform communication through the network, and the notification signal includes identification information to distinguish a data set formed of the one or more pieces of data from another data set.

The present invention enables flexible definition as to how pieces of data are aggregated and sent by what condition determination in an apparatus performing aggregation and accumulation of data such as sensor data.

BRIEF DESCRIPTION OF THE DRAWINGS

FIG. 4 is a diagram illustrating an example of content of communication from the data accumulation apparatus to a cloud DB;

FIG. 5 is a diagram illustrating another example of the script;

FIG. 6 is a block diagram illustrating configuration of a data management system according to a second embodiment of the present invention;

DETAILED DESCRIPTION

Embodiments of the present invention will be described hereinafter with reference to drawings.

First Embodiment

Figure 1:
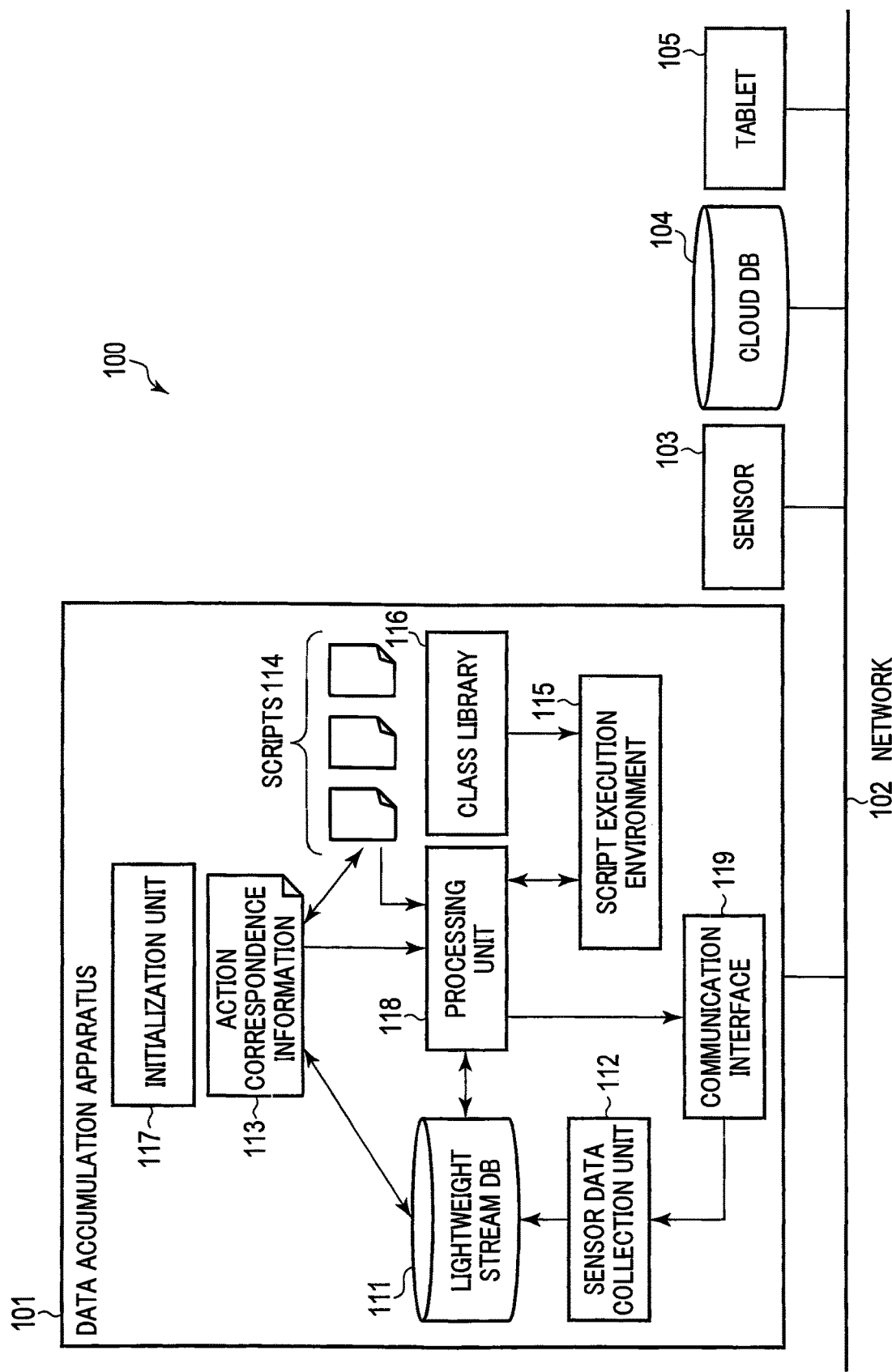
FIG. 1 is a block diagram illustrating configuration of a data management system according to a first embodiment of the present invention.

FIG. 1 illustrates configuration of a data management system 100 according to a first embodiment of the present invention. In the data management system 100, a data accumulation apparatus 101, a sensor 103, a cloud DB 104, and a tablet 105 are connected to a network 102. Connection thereof to the network 102 may be wired or wireless connection. The sensor 103 performs measurement, for example, at regular time intervals, and sends a measurement result (sensor data) to the data accumulation apparatus 101 through the network 102. The data accumulation apparatus 101 accumulates the data collected from the sensor 103 through the network 102. In the present embodiment, the system includes one sensor 103 to simplify the explanation, but a plurality of sensors 103 may be connected to the network 102.

The data accumulation apparatus 101 retains at least one condition registered in advance. When new data is accumulated, the data accumulation apparatus 101 determines whether the data matches each of the conditions, and performs processing corresponding to the matched condition. For example, the data accumulation apparatus 101 sends a notification signal to the cloud DB 104 or the tablet 105 through the network 102. The notification signal may include, for example, part of data accumulated in the data accumulation apparatus 101. The cloud DB 104 is implemented on, for example, a server device not illustrated. The tablet 105 is an example of the information processing apparatus. Examples of the information processing apparatus include a personal computer (PC), a server device, a smartphone, a mobile phone, and the like. A plurality of tablets 105 may be connected to the network 102.

The data accumulation apparatus 101 is formed of an information processing apparatus, such as a server device or a PC, and includes a processor, such as a CPU (Central Processing Unit), a memory, and a communication interface 119 to perform communication through the network 102, as hardware. The data accumulation apparatus 101 may further include an interface for input and output, such as a display, a keyboard, or a mouse. The conditions described above may be set through the interface for input and output, or set from the outside through the network 102, for example. The conditions are stored in the memory.

The data accumulation apparatus 101 includes a lightweight stream DB 111, a sensor data collection unit 112, a script execution environment 115, a class library 116, an initialization unit 117, and a processing unit 118, and retains action correspondence information 113 and scripts 114. Various types of processing performed by the lightweight stream DB 111, the sensor data collection unit 112, the initialization unit 117, and the processing unit 118 can be achieved by reading and executing various programs from the memory with the processor. The data accumulated in the lightweight stream DB 111, the class library 116, the action correspondence information 113, and the scripts 114 are stored in the memory.

In the present embodiment, uTSLite is used as the lightweight stream DB 111. uTSLite has an accumulation and retrieval function to accumulate data and perform retrieval on the accumulated data, and a notification function to output notification when newly accumulated data matches any of the conditions registered in advance. Specifically, the accumulation and retrieval function is a function to: perform retrieval processing of a data value accumulation type including accumulating data in a data depository, and inputting a conditional expression later, thereby retrieving data matching a conditional expression from the data depository; and notify a retrieval result. The notification function is a function to: perform retrieval processing of a conditional expression waiting type including accumulating conditional expressions in a conditional expression depository, and writing data to a data depository later, thereby retrieving the conditional expression matching the data from the conditional expression depository; and notify a retrieval result.

The scripts 114 are described in a JavaScript (registered trademark) language, and a JavaScript execution environment is used as the script execution environment 115. The JavaScript execution environment can be easily achieved by using open source software, such as Node.js. In addition, the class library 116 is registered (installed) in advance in the script execution environment 115 using a standard function of the JavaScript execution environment. In this manner, the class library 116 can be called by the description in the script 114. The class library 116 provides a class to retrieve data from the lightweight stream 111, and a class to perform communication through the network 102 by a HTTP (HyperText Transfer Protocol) or HTTPS (HyperText Transfer Protocol Secure) protocol. In other words, the script execution environment 115 has property of being capable of describing an instruction to retrieve data from the lightweight stream DB 111 and an instruction to perform communication through the network 102 by the HTTP or HTTPS protocol, according to the script 114 being executed.

The sensor data collection unit 112 has a function to wait for connection by HTTP, that is, serves as an HTTP server. The sensor data collection unit 112 receives sensor data from the sensor 103 through the network 102, and registers the sensor data in the lightweight stream DB 111.

Software of a type generally called "document-oriented DB" is used as the cloud DB 104. For example, Elastic search being open source software may be used. A document-oriented DB is capable of accumulating documents described in JSON (JavaScript Object Notation) or XML (Extensible Markup Language) data format.

An ordinary Android terminal in which DeviceConnect being open source software is installed is used as the tablet 105. DeviceConnect is software providing a function of receiving a notification signal from the outside and drawing alert display on the screen, or displaying web content of designated URL (Uniform Resource Locator) on the browser. Another software having a function equal to DeviceConnect may be used.

The initialization unit 117 registers conditional expressions in the lightweight stream DB 111 and retains the scripts 114, and performs processing to retain correspondence between the conditional expressions and the scripts 114 as the action correspondence information 113, when the data accumulation apparatus 101 is started up. For example, the correspondence to associate the conditional expression "temperature>80° C." with the script "action1.js" and associate the conditional expression "intruder=true" with the script "action2.js" is described in the definition file to be read in startup. The initialization unit 117 registers the conditional expression "temperature>80° C." in the lightweight stream DB 111, reads the contents of the file "action1.js" as the script 114, and retains it on the memory. In the same manner, the initialization unit 117 registers the conditional expression "intruder=true" in the lightweight stream DB 111, reads the contents of the file "action2.js" as the script 114, and retains it on the memory. The initialization unit 117 also retains correspondence between the conditional expressions and the scripts 114 on the memory as follows, as information corresponding to the action correspondence information 113.

As the action correspondence information 113, for example, in the example described above, a data structure is retained on the memory such that the correspondence "action1.js" is obtained when it is notified that the data matches the conditional expression temperature>80° C. For example, because uTSLite has the function of calling the designated function with the designated identifier in notification, it is easily determined to which conditional expression the event notification corresponds, by using a language function, such as the class object, the associative array, or the lambda expression in the C++ language. For example, in the example described above, the correspondence of "action1.js" is easily obtained when the data matches the condition temperature>80° C. In this case, the information secured on the memory with the function of the C++ language, such as the class object, the associative array, or the lambda expression, and the information for event notification retained in the uTSLite correspond to the action correspondence information 113. Like this example, it is possible to adopt implementation as a matter of course, in which no explicit data structure or storage exists, such as an array corresponding to the action correspondence information 113, and corresponding information is retained in a fragmentary state on the memory.

The processing unit 118 receives the notification from the lightweight stream DB 111, specifies the script 114 associated with the conditional expression serving as a trigger to issue the notification with reference to the action correspondence information 113, and executes the script 114 using the script execution environment 115.

Figures 2, 3:
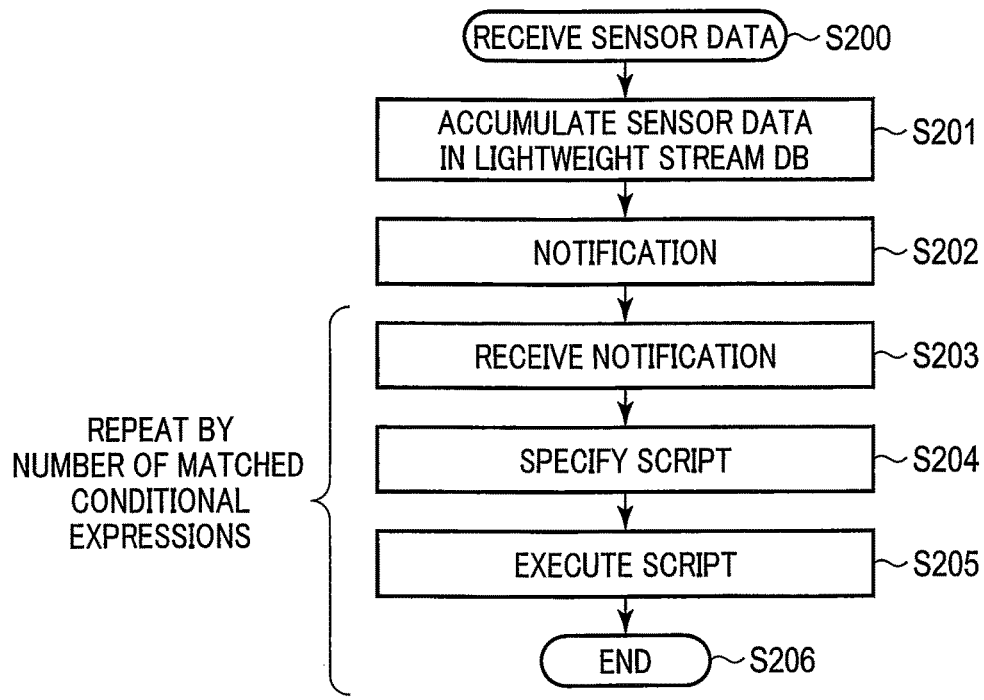
FIG. 2 is a flowchart illustrating sensor data registration processing of a data accumulation apparatus illustrated in FIG. 1.
FIG. 3 is a diagram illustrating an example of a script.

FIG. 2 illustrates an example of flow of sensor data registration processing in the data accumulation apparatus 101.

When the sensor 103 transmits sensor data of a measurement result to the data accumulation apparatus 101 through the network 102 using the HTTP protocol, the sensor data collection unit 112 accepts HTTP connection. Specifically, the sensor data collection 112 receives sensor data from the sensor 103 (Step S200), and accumulates the received data in the lightweight stream DB 111 (Step S201). The accumulation processing at Step S201 is easily achieved by calling the data registration function provided by the lightweight stream DB 111, with the received data serving as an argument. In this operation, when the data matches the conditional expression registered in advance, a notification is output from the lightweight stream DB 111 (Step S202), and the processing unit 118 receives the notification (Step S203). With the function of the lightweight stream DB 111, the notification includes data accumulated at Step S201, that is, data serving as the notification trigger. Thereafter, the processing unit 118 specifies the corresponding script 114 based on the action correspondence information 113 (Step S204). Thereafter, the processing unit 118 executes the script 114 specified at Step S204 using the script execution environment 115 (Step S205). In this operation, the processing unit 118 executes the script after setting the data serving as the notification trigger as the value of the variable "event" readable in the script. Lastly, the processing unit 118 ends the processing on the notification (Step S206).

When the data matches N conditional expressions, because the data accumulation apparatus 101 a notification from the lightweight stream DB 111 N times, the processing from Step S203 to Step S206 described above is repeatedly executed N times. N is an integer of 0 or more.

The data accumulation apparatus 101 according to the present embodiment performs the basic operation described above, thereby describing various actions for various conditions designated at initialization by the program of JavaScript. Thus, it is possible to achieve various functions by only replacing the setting files in a single developed apparatus. In particular, because retrieval of the lightweight stream DB 111 and HTTP or HTTPS communications to various communication parties is easily described from JavaScript using the function of the class library 116, it is possible to flexibly and easily achieve the functions required in an apparatus performing aggregation and accumulation of information, such as sensor data.

The following explanation further illustrates some examples of script description, to specifically describe the advantage of the data accumulation apparatus 101 according to the present embodiment.

FIG. 3 illustrates an example of the script. A script 300 illustrated in FIG. 3 achieves an operation of retrieving a set of data in which the value of the key "subject" is the character string "sensor", the value of the key "type" is the character string "thermometer", and the time stamp having the precision of milliseconds and stored as the value of the key "date" falls within the range of time from 60 seconds before the present to the present in the data accumulated in the lightweight stream DB 111, and registering the set of data as one data entry in the cloud DB 104.

First, with the row group 301, the value of the current time and the value of the time of 60 seconds before the current time are obtained. Thereafter, the class library "ajax.collect" is called with the row 302, and a result is obtained by searching the lightweight stream DB 111. The library "ajax.collect" is one of class functions provided from the class library 116. Implementation of this class is easily achieved by substituting the provided argument for the variable type used for input and output of the lightweight stream DB 111, and calling the function of the lightweight stream DB 111.

When the retrieval result is not empty, the class library "ajax.request" is called with the row 303, and HTTP POST communication is sent to register the result in the cloud DB 104. The library "ajax.request" is one of class functions provided from the class library 116. Implementation of this class is easily achieved by setting the contents of the provided arguments "type" and "headers" as the header of the HTTP protocol for the host of the URL indicated with the provide argument "url", and using the contents of the provided argument "data" as the content. The processing to perform HTTP communication may be performed using OSS (Open Source Software) which is widely provided. In the row 303, the retrieval result is stored as the argument "data". The retrieval result is formed of a string of pieces of data. With the standard function included in JavaScript and the JSON format and enabling description of pieces of data in a nest manner, a string of a plurality of pieces of data can be dealt with as a nest value. The content is reflected on the communication content as they are. In addition, in JavaScript, the language itself has a function of automatically converting the data into the JSON format in input and output of data with the outside.

Although it is not used in the example of the script 300, because the value of the variable "event" stores data serving as the notification trigger as described above, the script can be described to use the data. For example, it is easy to describe a script that uses the time stamp of data serving as the notification trigger as the value of the identifier, and provides the value to all the other pieces of data, to distinguish them from other pieces of data later.

FIG. 4 illustrates an example of communication content to the cloud DB 104. A message 400 illustrated in FIG. 4 indicates content stored in the body in the HTTP protocol. As described above, the content stores a string of data serving as a retrieval result with the row 303 of the script 300 illustrated in FIG. 3. Because it is data accumulated in the DB that is obtained by search of the DB, the data received from the sensor 103 at Step S200 (FIG. 2) before and accumulated at Step S201 is reflected as it is on the message 400. For example, the row 401 indicates data in which the key "date" has a value of 1473240068, the key "subject" has a value "sensor", the key "temperature" has a value of 27.53125, and the key "type has a value "thermometer".

The example of the message 400 is expressed with array data in which five data entries are arranged in a nest manner in the JSON format. In the case where Elasticsearch is used as the cloud DB 104, when such a message is received, the cloud DB 104 has the operation specification in which five data entries are generated. The number of data entries are not limited to five, but may be 1, 2 to 4, or 6 or more.

The data is not limited to a nest structure, but may be stored and sent in another data structure (such as array, list, or structure). The data may be sent after each of pieces of data is provided with any identifier. This enables the receiving side of the network 102 to recognize that the pieces of data are sent together as a set.

FIG. 5 illustrates another example of the script. A script 500 illustrated in FIG. 5 achieves an action to perform notification on the tablet 105 and promote browser display, by transmitting a request in which time information indicating the time range from the time of 60 seconds before the current time to the current time is embedded in the instruction sentence to the tablet 105.

First, the value of the current time and the value of the time of 60 seconds before the current time are obtained with a row group 501. Thereafter, the class library "ajax.request" is called with the row 502, and HTTP POST communication is sent to the tablet 105. In this operation, the IP address of the tablet 105 is designated with the argument "url". In addition, as the content of the argument "data" serving as the content of HTTP, the character string in which the time information calculated with the row group 501 is embedded is generated and sent.

DeviceConnect installed in the tablet 105 used in the present embodiment has operation specification of first displaying notification on the terminal when it receives HTTP content of such form, and displaying web content of the URL designated with the content when the notification icon is tapped.

By embedding the time information together with the URL, the displayed web content is enabled to perform processing using the time information. For example, it is possible to easily prepare web content to retrieve data indicated in the range of the time information from the cloud DB 104, and displays the data as a line graph.

As described above, in the present embodiment, it is possible to register pairs of correspondence of the conditional expressions to the scripts in initialization. The conditional expressions of the respective pairs may be different, or the same conditional expression may be used in some pairs of correspondence. For this reason, the correspondence in which the script 300 is associated with the conditional expression, and the correspondence in which the script 500 is associated with the same conditional expression are registered in initialization. In this manner, data of the sensor is registered with an event occurring at the certain time, the conditional expressions become true, and the script 300 and the script 500 are successively executed without time interval. Because the range of the time stamp of data serving as the retrieval target in the row 302 of the script 300 agrees with the time range included in the message in the row 502 of the script 500, the web content displayed on the tablet that has received a notification signal with the script 500 is enabled to display the data serving as the retrieval target as a graph. As described above, according to the present embodiment, the time stamp information embedded in the sensor data as a matter of course is also used as the identifier, to enable recognition of correspondence when the data registered in the cloud DB 104 is displayed as the web content later.

The scope of the present invention is not limited thereto. The present invention may be achieved with a structure in which a plurality of pieces of data is registered as, for example, a long data entry, in the cloud DB 104, or pieces of data are provided with respective keys in new JSON data format and specific identifiers are provided as the values of the keys. In particular, the latter is easily achieved by adding a loop sentence to patrol each element of the variable "thermometer" and adds a key before the row 303 of the script 300. The value included in the variable "event" may be used as the key.

The following is an explanation of specific effects obtained according to the present embodiment described above.

An advantage of reduction in communication quantity by aggregation of registration of sensor data is obtained by describing a condition with low establishment frequency as the conditional expression, performing retrieval in a range to acquire a number of entries from the lightweight stream DB 111 with the script associated with the conditional expression, and sending a result of retrieval to the cloud DB 104. For example, when 60 pieces of data from a temperature sensor transmitted once per minute are accumulated to transmit pieces of information for one hour together to the cloud DB 104, the number of times of communication is reduced, and the communication load is reduced. As another example, when the temperature unusually increases, the number of times of communications can be reduced by transmitting several pieces of data directly before the unusual increase in a batch to the cloud DB 104. This enables reduction in communication load. In addition, when the temperature unusually increases, data is transmitted to the cloud without waiting for execution of processing to batch pieces of data for one hour. This enables acquisition of an advantage that abnormality can be promptly sensed while the communication load is reduced.

These conditional expressions and setting as to what cloud DB 104 the retrieval conditions are to be set can be easily customized by changing the file to be read in initialization. This enables flexible change of the definition, and reduction in the number of steps to develop the system of the sensor network using the apparatus of the present invention.

In the present embodiment, the single class library "ajax.request" achieves both data registration to the cloud DB 104 in the row 303 of the script 300 (FIG. 3) and notification for the tablet 105 in the row 502 of the script 500 (FIG. 5). This is because both the cloud DB 104 and the tablet 105 used in the present embodiment provide an API (Application Program Interface) to achieve functions, such as data registration and notification display, by receiving communication by HTTP. As described above, because the HTTP serving as a web technique or the API obtained by combining HTTP with JSON has become widespread in the technical field called cloud or IoT, the apparatus like the data accumulation apparatus 101 according to the present embodiment produces an advantage of being capable of being combined with a wide variety of apparatuses with a single mechanism by adopting HTTP and JSON as a standard input and output. In the present embodiment, because the communication function from the script 114 is provided from the class library 116, the present embodiment has an advantage that the apparatus can be expanded to a communication party including various protocols as the API by expansion of the class library 116. In addition, it is possible to connect with many parties without expansion of the class library 116 by providing communications by HTTP and JSON in advance as a standard function as the class library 116.

In the present embodiment, uTSLite is used as the lightweight stream 111. This structure produces an advantage that a single functional module achieves the function of accumulating data and retrieving data later, and the function of performing notification when the data accumulated later matches the condition registered in advance. The scope of the present invention is not limited thereto. Another DB system may be used, or the respective functions may be achieved separately. For example, the function of accumulating data and retrieving the data later may be achieved using a relational database. The function of performing notification when the data accumulated later matches the condition registered in advance may be achieved using a technique, such as an array, a list, an associative array, a tree structure, a Pub-Sub system, a stored procedure, or a stream DB.

In the present embodiment, JavaScript language is used for the script 114. The JavaScript language is widely used when communication to the cloud is described in combination with HTTP and JSON, and has an advantage that various existing libraries can be used. The scope of the present invention is not limited thereto, but another programming language may be used.

In the present embodiment, JSON is used as the data form of the data exchange code. The scope of the present invention is not limited thereto, but another data form may be used. In particular, in the document-oriented DB, XML is also widely used as the data form. Using XML as the data form produces an advantage of increase in type of the cloud DBs that can be used in combination.

The present embodiment illustrates that the data accumulation apparatus 101 is achieved with one information processing apparatus. In another embodiment, the data accumulation apparatus 101 may be achieved with a combination of a plurality of information processing apparatuses.

Second Embodiment

FIG. 6 illustrates configuration of a data management system 600 according to a second embodiment of the present invention. In FIG. 6, elements similar to the elements illustrated in FIG. 1 are denoted by the same reference numerals, and an explanation of the elements will be properly omitted. In the data management system 600, a data accumulation apparatus 601, the sensor 103, the cloud DB 104, and an apparatus 600 are connected to the network 102. The apparatus 605 is an example of the information processing apparatus. The apparatus 605 may have the same structure as that of the tablet 105 explained in the first embodiment. The apparatus 605 includes a sensor 606. The sensor 606 performs measurement to generate sensor data, and transmits the sensor data to the data accumulation apparatus 601 through the network 102.

The data accumulation apparatus 601 is an information processing apparatus, such as a server device or a PC, and includes a processor, such as a CPU, a memory, and the communication interface 119 to preform communication through the network 102, as hardware. The data accumulation apparatus 601 may further include an interface for input and output, for example, a display, a keyboard, and a mouse.

The data accumulation apparatus 601 includes the lightweight stream DB 111, the sensor data collection unit 112, action correspondence information 613, a binary execution environment 615, the initialization unit 117, and a processing unit 618. The processing unit 618 includes a notification unit 619 and a process execution unit 620. Various types of processing performed by the lightweight stream DB 111, the sensor data collection unit 112, and the initialization unit 117 may be achieved by reading and executing various programs from the memory with the processor.

The binary execution environment 615 includes a class library (not illustrated in FIG. 6) similar to the class library 116 explained in the first embodiment. For example, the class library provides a class to retrieve data from the lightweight stream DB 111, and a class to perform communication with the HTTP or HTTPS protocol or a MQTT (MQ Telemetry Transport) protocol through the network 102. In other words, the binary execution environment 615 has property of being capable of describing an instruction to perform data retrieval from the lightweight stream DB 111 and an instruction to perform communication with the HTTP or HTTPS protocol or MQTT through the network 102, by a process 614 operating on the binary execution environment 615.

The process execution unit 620 executes the process (also referred to as binary file or binary) 614 using the binary execution environment 615. In this manner, the process 614 operates on the binary execution environment 615. The process 614 is generated by input of a source file to the data accumulation apparatus 601 through the communication interface 119 or the interface for input and output and compiling of the source file on the data accumulation apparatus 601. The action correspondence information 613 indicates correspondence between the conditions registered in advance and the processes 614 operating on the binary execution environment 615.

On receipt of notification from the lightweight stream DB 111, the notification unit 619 specifies the process 614 associated with the condition serving as a trigger of issuance of the notification with reference to the action correspondence information 613, and outputs notification to the specified process 614. The process 614 that has received the notification from the notification unit 619 performs predetermined processing. The processes 614 may perform processing similar to those of the scripts 114 explained in the first embodiment. For example, the process 614 performs processing to search the lightweight stream DB 111, and a processing to transmit a notification signal notifying occurrence of an event and including data acquired by retrieval to the external device (such as the apparatus 605) through the network 102.

Instead of the implementation described above, the process execution unit 620 may specify the process 614 associated with the condition serving as a trigger of occurrence of the notification with reference to the action correspondence information 613, on receipt of notification from the lightweight stream DB 111, and execute the specified process 614 using the binary execution environment 615. In this case, the process 614 performs predetermined processing when it is started.

When the data accumulation apparatus 601 boots up, the initialization unit 117 registers conditions in the lightweight stream DB 111, causes the process execution unit 620 to execute the processes 614, and causes the memory to retain the action correspondence information 613 indicating correspondence between the conditions and the processes 614. The action correspondence information 613 may be edited based on an instruction from the process 614 while the data accumulation apparatus 601 is active.

Figure 7:
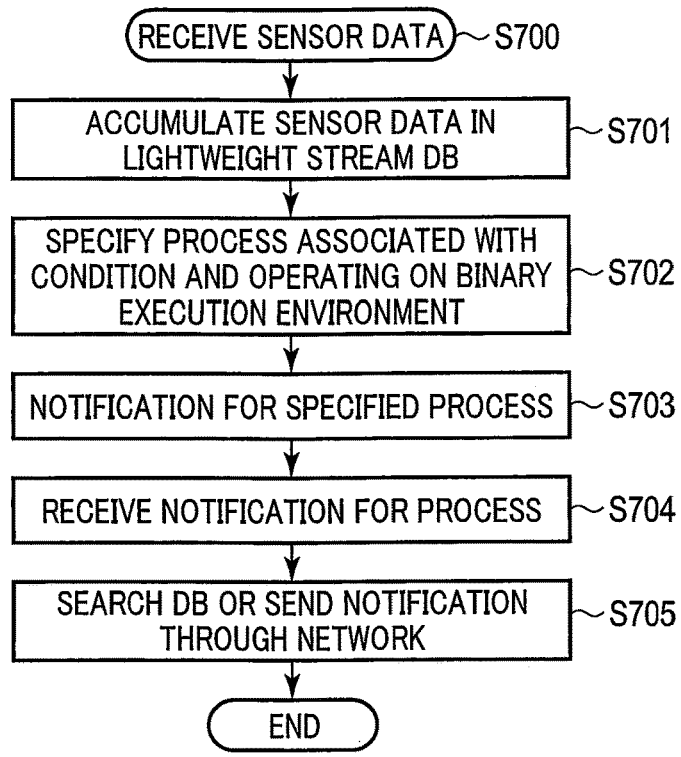
FIG. 7 is a flowchart illustrating sensor data registration processing of a data accumulation apparatus illustrated in FIG. 6.

FIG. 7 illustrates an example of flow of sensor data registration processing in the data accumulation apparatus 601.

When the sensor 103 transmits sensor data to the data accumulation apparatus 601 through the network 102, the sensor data collection unit 112 receives sensor data from the sensor 103 (Step S700), and accumulates the received sensor data in the lightweight stream DB 111 (Step S701).

When the sensor data newly accumulated in the lightweight stream DB 111 matches any condition, the lightweight stream DB 111 outputs notification indicating the condition which the sensor data newly accumulated in the lightweight stream DB 111 matches to the notification unit of the processing unit 618. The notification unit 619 of the processing unit 618 specifies the process 614 associated with the condition with reference to the action correspondence information 613 (Step S702). Thereafter, the notification unit 619 outputs notification to the specified process 614 (Step S703). The process execution unit 620 executing the specified process 614 receives the notification from the notification unit 619 (Step S704), and searches the lightweight stream DB 111 and/or sends a notification signal through the network 102 (Step S705).

The data accumulation apparatus 601 according to the present embodiment is enabled to achieve various functions only by switching the setting file (process or the source file thereof) in a single developed apparatus, in the same manner as the first embodiment.

Figure 8:
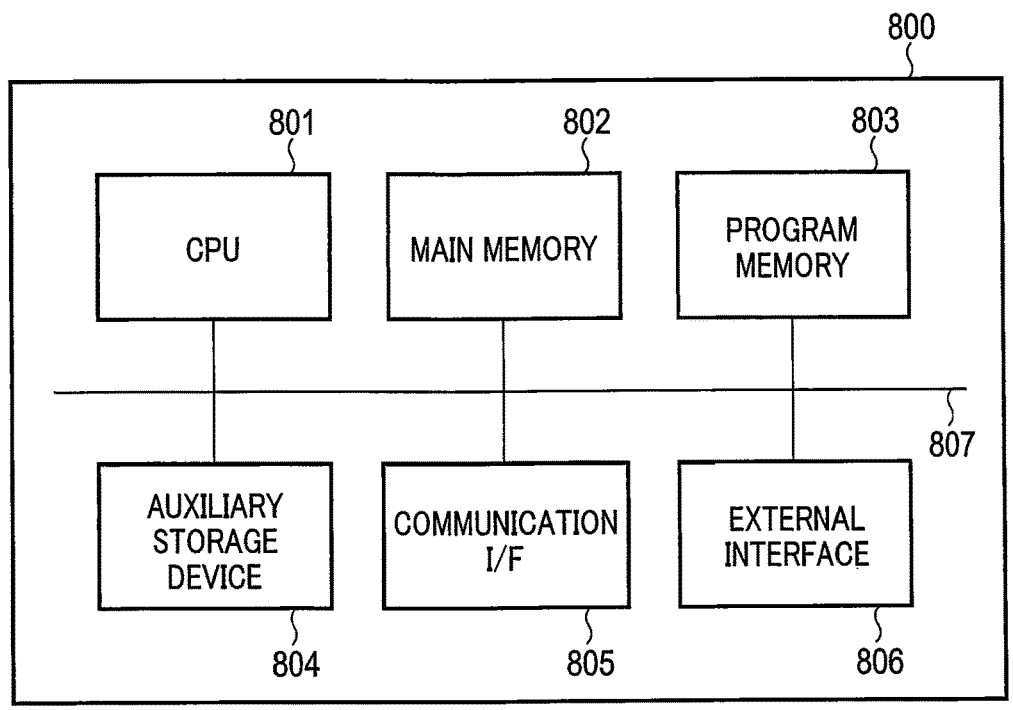
FIG. 8 is a block diagram illustrating a hardware configuration example of a data accumulation apparatus according to an embodiment of the present invention.

FIG. 8 illustrates an example of hardware configuration of a data accumulation apparatus 700 according to one embodiment. The data accumulation apparatus 700 may be the data accumulation apparatus 101 or the data accumulation apparatus 601. As illustrated in FIG. 8, the data accumulation apparatus 800 includes a CPU 801, a main memory 802, a program memory 803, an auxiliary storage device 804, a communication interface 805, and an external interface 806, which are connected through a bus 807.

The CPU 801 reads a program stored in the program memory 803, loads the program onto the main memory 802, and executes the program to achieve the functions described above with respect to the data accumulation apparatus 101 or the data accumulation apparatus 601. The main memory 802 is, for example, a SRAM (static random access memory) or a DRAM (dynamic random access memory). The program memory 803 may be a ROM (read-only memory), or may be implemented as part of the auxiliary storage device 804. The auxiliary storage device 804 is, for example, a HDD or a SSD, and stores various types of data.

The communication interface 805 includes a wired communication module, a wireless communication module, or a combination thereof, and communicates with the external device (such as the sensor 103 and the cloud DB 104). The external interface 806 is an interface to connect with an input device, such as a keyboard, and an output device, such as a display device.

The CPU 801 is an example of the processor. The processor is not limited to a general-purpose processing circuit like the CPU 801. The processor may be a dedicated processing circuit, such as an ASIC (Application Specific Integrated Circuit) or a FPGA (Field Programmable Gate Array). When a dedicated processing circuit is used as the processor, the program may exist in the dedicated processing circuit. The processor may include one or more general-purpose processing circuits and/or one or more dedicated processing circuits.

The program for achieving the processing described above may be stored and provided in a computer-readable recording medium. The program is stored as a file of an installable or executable format in a recording medium. Examples of the recording medium that can be used include a magnetic disk, an optical disk (such as a CD-ROM, a CD-R, and a DVD), a magneto-optical disk (such as a MO), and a semiconductor memory. Any recording medium may be used as long as it can store a program and is computer-readable. The program for achieving the processing described above may be stored on a computer (server) connected to a network, such as the Internet, and downloaded to the data accumulation apparatus 800 through the network.

The sensor data referred to in the present invention includes real-world information measured by a sensor device, and other various information can serve as the target. As specific examples, it is possible to deal with values measured by a sensor device, such as the temperature, the humidity, the current or voltage value, the flow rate of fluid, the density, the brightness, the noise, the position, and the acceleration of a substance. The sensor data are not limited thereto, but may be information acquired by an object other than a sensor, such as information acquired through the web and/or the Internet. In addition, the sensor data may be information including metadata, such as the property and the state of the sensor and the measurement date and time, in addition to those values.

The present invention is not limited to each of the embodiments described above, but may be embodied with the elements modified without departing from the spirits of the present invention. Various inventions can be formed with proper combinations of the elements disclosed in the embodiments described above. For example, some elements may be deleted from the elements disclosed in each of the embodiments. In addition, the elements of the different embodiments may properly be used in combination.

The invention claimed is:

1. A data accumulation apparatus for temporarily accumulating data received from a first device through a network and transmitting the data to a second device through the network, the data accumulation apparatus comprising:

a memory configured to store data providing a script execution environment, scripts, and action correspondence information, the action correspondence information indicating correspondence between the scripts and conditions registered in advance, each of the conditions being associated with a script to be performed when the condition is satisfied, the script execution environment having property of being capable of describing an instruction to perform data retrieval and an instruction to perform communication through the network according to a script among the scripts that is executed; and a processor coupled to the memory, a combination of the processor and the memory being configured to function as a database including a first function to accumulate data in the database and perform retrieval on the accumulated data, and a second function to output notification in response to new data from the first device being accumulated in the database and matching a condition of the conditions registered in advance, the scripts including a first script configured to retrieve data within a predetermined time range from the database and transmit a notification signal including the retrieved data to the second device and a second script configured to transmit a notification signal to notify a third device connected to the network of occurrence of an event, the processor being configured to function as:

a collection unit configured to collect data from the first device through the network and register the data in the database; and a processing unit configured to specify, on receipt of the notification, a script associated with the matched condition according to the action correspondence information, and execute the specified script using the script execution environment.

2. The data accumulation apparatus according to claim 1, wherein the scripts include:

an acquisition unit acquiring data from the database in accordance with the instruction to perform data retrieval; and a sending unit sending the data acquired by the acquisition unit to the network in accordance with the instruction to perform communication through the network.

3. The data accumulation apparatus according to claim 2, wherein each of the conditions is a condition matching only part of data in a set of all the data registered by the collection unit, the data acquired by the acquisition unit is one or more pieces of data, and the one or more pieces of data is sent in a state of being stored in a data structure of one of an array, a list, and a nest structure, or sent after identifiers are provided to the one or more pieces of data, when the one or more pieces of data is sent in accordance with the instruction to perform communication through the network.

4. The data accumulation apparatus according to claim 1 wherein the script execution environment includes a class library, the class library includes a class to perform data retrieval and a class to perform communication through the network, and the property is achieved by calling the class library with the script being executed.

5. The data accumulation apparatus according to claim 1, wherein the instruction to perform communication through the network uses a HTTP or HTTPS protocol as a transport protocol, and uses a JSON or XML data format as a data exchange code.

6. The data accumulation apparatus according to claim 1, wherein the processing unit sends an accumulation instruction to a document-oriented database in accordance with the instruction to perform communication through the network, the document-oriented database accumulating a document described in a JSON or XML data format.

7. The data accumulation apparatus according to claim 1, wherein the processing unit sends a notification signal to notify an information processing apparatus connected to the network of occurrence of an event, in accordance with the instruction to perform communication through the network.

8. The data accumulation apparatus according to claim 3, wherein the processing unit sends a notification signal to notify an information processing apparatus connected to the network of occurrence of an event, in accordance with the instruction to perform communication through the network, and the notification signal includes identification information to distinguish a data set formed of the one or more pieces of data from another data set.

9. The data accumulation apparatus according to claim 1, wherein both the database and the processing unit are achieved using Light uTupleSpace (uTSLite).

10. A data accumulation apparatus for temporarily accumulating data received from a first device through a network and transmitting the data to a second device through the network, the data accumulation apparatus comprising:

a memory configured to store data providing a binary execution environment and action correspondence information, the action correspondence information indicating correspondence between conditions registered in advance and processes operating on the binary execution environment, the binary execution environment having property of being capable of describing an instruction to perform data retrieval and an instruction to perform communication through the network, according to the process being executed; and a processor coupled to the memory, a combination of the processor and the memory being configured to function as a database including a first function to accumulate data in the database and perform retrieval on the accumulated data and a second function to output first notification in response to new data from the first device being accumulated in the database and matching a condition of the conditions, the conditions being registered in the database in advance, the processes including a first process configured to retrieve data within a predetermined time range from the database and transmit a notification signal including the retrieved data to the second device, and a second process configured to transmit a notification signal to notify a third device connected to the network of occurrence of an event, the processor being configured to function as:

a process execution unit configured to execute the processes using the binary execution environment;

a collection unit configured to collect data from the first device through the network and register the data in the database; and a notification unit configured to specify, on receipt of the first notification, a process associated with the matched condition according to the action correspondence information and output second notification to the specified process.

11. The data accumulation apparatus according to claim 10, wherein the processes include:

an acquisition unit acquires data from the database, in accordance with the instruction to perform data retrieval; and a sending unit sending the data acquired by the acquisition unit to the network, in accordance with the instruction to perform communication through the network.

12. The data accumulation apparatus according to claim 10, wherein the binary execution environment includes a class library,
the class library includes a class to perform data retrieval and a class to perform communication through the network, and
the property is achieved by calling the class library with the process being executed.

13. A data accumulation method performed by a data accumulation apparatus for temporarily accumulating data received from a first device through a network and transmitting the data to a second device through the network, the data accumulation apparatus comprising: a script execution environment; a database including a first function to accumulate data in the database and perform retrieval on the accumulated data and a second function to output notification in response to new data from the first device being accumulated in the database and matching a condition of conditions registered in advance; and a storage unit storing scripts and action correspondence information, the scripts including a first script configured to retrieve data within a predetermined time range from the database and transmit a notification signal including the retrieved data to the second device and a second script configured to transmit a notification signal to notify a third device connected to the network of occurrence of an event, the action correspondence information indicating correspondence between the scripts and the conditions registered in advance, the script execution environment having property of being capable of describing an instruction to perform data retrieval and an instruction to perform communication through the network, the method comprising:
    collecting data from the first device through the network and registering the data in the database;
    determining, when new data is accumulated in the database, whether the new data matches the conditions registered in advance;
    outputting notification in response to the new data matching a condition of the conditions; and
    specifying, on receipt of the notification, a script associated with the matched condition according to the action correspondence information, and executing the specified script using the script execution environment.

14. A non-transitory computer readable medium comprising a program to cause a computer to implement a data accumulation method performed by a data accumulation apparatus for temporarily accumulating data received from a first device through a network and transmitting the data to a second device through the network, comprising: a script execution environment; a database including a first function to accumulate data in the database and perform retrieval on the accumulated data and a second function to output notification in response to new data from the first device being accumulated in the database and matching a condition of conditions registered in advance; and a storage unit storing scripts and action correspondence information, the scripts including a first script configured to retrieve data within a predetermined time range from the database and transmit a notification signal including the retrieved data to the second device and a second script configured to transmit a notification signal to notify a third device connected to the network of occurrence of an event, the action correspondence information indicating correspondence between the scripts and the conditions registered in advance, the script execution environment having property of being capable of describing an instruction to perform data retrieval and an instruction to perform communication through the network, the method comprising: collecting data from the first device through the network and registering the data in the database; determining, when new data is accumulated in the database, whether the new data matches the conditions registered in advance; outputting notification in response to the new data matching a condition of the conditions; and specifying, on receipt of the notification, a script associated with the matched condition according to the action correspondence information, and executing the specified script using the script execution environment.

15. A data accumulation method performed by a data accumulation apparatus for temporarily accumulating data received from a first device through a network and transmitting the data to a second device through the network, the data accumulation apparatus comprising: a binary execution environment; a database including a first function to accumulate data in the database and perform retrieval on the accumulated data and a second function to output first notification in response to new data from the first device being accumulated in the database and matching a condition of conditions registered in advance; and a storage unit storing action correspondence information indicating correspondence between the conditions and processes operating on the binary execution environment, the processes including a first process configured to retrieve data within a predetermined time range from the database and transmit a notification signal including the retrieved data to the second device, and a second process configured to transmit a notification signal to notify a third device connected to the network of occurrence of an event, the binary execution environment having property of being capable of describing an instruction to perform data retrieval and an instruction to perform communication through the network, according to the process being executed, the method comprising: collecting data from the first device through the network and registering the data in the database; when new data is accumulated in the database, determining whether the new data matches the conditions registered in advance, and outputting first notification in response to the new data matching a condition of the conditions registered in advance; and specifying, on receipt of the first notification, a process associated with the matched condition according to the action correspondence information, and outputting second notification to the specified process.

* * * * *